US009453491B2

(12) United States Patent
Tanaka et al.

(10) Patent No.: US 9,453,491 B2
(45) Date of Patent: Sep. 27, 2016

(54) METHOD OF DIAGNOSING GLOW PLUG AND GLOW PLUG DRIVE CONTROL DEVICE

(75) Inventors: Yutaka Tanaka, Higashimatsuyama (JP); Tomohiro Nakamura, Higashimatsuyama (JP); Yoshihito Fujishiro, Higashimatsuyama (JP); Yasuo Toyoshima, Higashimatsuyama (JP); Yasushi Hiratsuka, Higashimatsuyama (JP)

(73) Assignee: Bosch Corporation, Tokyo (JP)

( * ) Notice: Subject to any disclaimer, the term of this patent is extended or adjusted under 35 U.S.C. 154(b) by 277 days.

(21) Appl. No.: 14/345,971

(22) PCT Filed: Aug. 13, 2012

(86) PCT No.: PCT/JP2012/070593

§ 371 (c)(1), (2), (4) Date: Apr. 4, 2014

(87) PCT Pub. No.: WO2013/042488

PCT Pub. Date: Mar. 28, 2013

(65) Prior Publication Data

US 2014/0216384 A1 Aug. 7, 2014

(30) Foreign Application Priority Data

Sep. 20, 2011 (JP) ................................ 2011-204698

(51) Int. Cl.
*F02P 19/02* (2006.01)
*G01M 13/00* (2006.01)

(52) U.S. Cl.
CPC ............ *F02P 19/026* (2013.01); *F02P 19/027* (2013.01); *G01M 13/00* (2013.01); *F02P 19/025* (2013.01)

(58) Field of Classification Search
CPC .... F02P 19/026; F02P 19/027; F02P 19/025; G01M 13/00
USPC ............... 123/179.15, 179.21, 179.6, 143 R, 123/145 A, 169 R, 594–597, 623; 701/102, 701/113; 219/200, 205, 206, 482, 490, 492, 219/497, 506
See application file for complete search history.

(56) References Cited

U.S. PATENT DOCUMENTS 4,862,370 A * 8/1989 Arnold .................. F02D 41/062
123/145 A (Continued)

FOREIGN PATENT DOCUMENTS

DE 102009000232 A1 7/2009
EP 1818536 A2 8/2007

(Continued)

OTHER PUBLICATIONS

International Search Report for Application No. PCT/JP2012/070593 dated Oct. 23, 2012 (English Translation, 2 pages).

(Continued)

*Primary Examiner* — Joseph Dallo
(74) *Attorney, Agent, or Firm* — Michael Best & Friedrich LLP

(57) ABSTRACT

The presence or absence of degradation and abnormality is determined with high reliability by measuring a resistance value of a glow plug, which is in an operating state, as a latest resistance value. A method then determines whether or not the rate of the change of the latest resistance value with respect to an initial resistance value of the glow plug exceeds a first predetermined value. The method also determines whether or not the rate of the change of the latest resistance value with respect to a last resistance value that is a resistance value of the glow plug, which has been recently measured at the time of the acquisition of the latest resistance value, exceeds a second predetermined value when the rate of change of the latest resistance value with respect to the initial resistance value of the glow plug exceeds the first predetermined value. The method determines that the glow plug is in an abnormal degradation state when the rate of the change of the latest resistance value with respect to the last resistance value exceeds the second predetermined value.

11 Claims, 4 Drawing Sheets

(56) References Cited

U.S. PATENT DOCUMENTS 4,962,300 A * 10/1990 Watanabe ............. F02P 19/025 123/179.21
5,218,183 A * 6/1993 Kimata ................... F23Q 7/001 123/145 A
6,009,369 A * 12/1999 Boisvert ............... F02P 19/026 123/145 A
6,148,258 A * 11/2000 Boisvert ............... F02P 19/022 123/145 A
6,336,083 B1 * 1/2002 Lanham ................... H05B 3/00 361/7
7,658,174 B2 * 2/2010 Stoller .................. F02P 19/022 123/145 A
7,707,985 B2 * 5/2010 Lykowski .......... B23K 35/3066 123/169 EL
8,701,614 B2 * 4/2014 Cassani ................. F02D 35/026 123/145 A
2001/0050275 A1 * 12/2001 Uhl ....................... F02P 19/021 219/270
2002/0043524 A1 * 4/2002 Taniguchi ............... F02P 17/12 219/270
2003/0127450 A1 * 7/2003 Uhl ....................... F02P 19/025 219/494
2004/0255889 A1 * 12/2004 Kumada ............... F02P 19/025 123/179.6
2007/0045276 A1 * 3/2007 Fisher ....................... F23Q 7/16 219/268
2009/0037120 A1 * 2/2009 Hiramatsu ............ F02P 19/025 702/34
2009/0179026 A1 * 7/2009 Morita et al. ......... F02P 19/027 219/497
2009/0294431 A1 * 12/2009 Sakurai ................. F02P 19/025 219/268
2010/0094523 A1 * 4/2010 Kernwein ............. F02P 19/022 701/102
2010/0161150 A1 * 6/2010 Sakurai ................. F02P 19/027 700/296
2010/0243635 A1 * 9/2010 Nakamura ................ F23Q 7/22 219/270
2010/0256866 A1 * 10/2010 Toda ..................... F02P 19/027 701/29.2
2011/0000901 A1 * 1/2011 Bauer ................... F02P 19/025 219/494
2011/0303650 A1 * 12/2011 Sakurai ................. F02P 19/025 219/263

FOREIGN PATENT DOCUMENTS

EP 2290224 A2 3/2011
JP 09088795 3/1997
JP 2000055861 A * 2/2000
JP 2009036092 2/2009
JP 2009191642 A * 8/2009
JP 2010090732 4/2010
JP 2010127487 6/2010
JP 2011043099 3/2011

OTHER PUBLICATIONS

Extended European Search Report for Application No. 12833002.4 dated Nov. 26, 2015 (6 pages).

* cited by examiner

Fig. 2

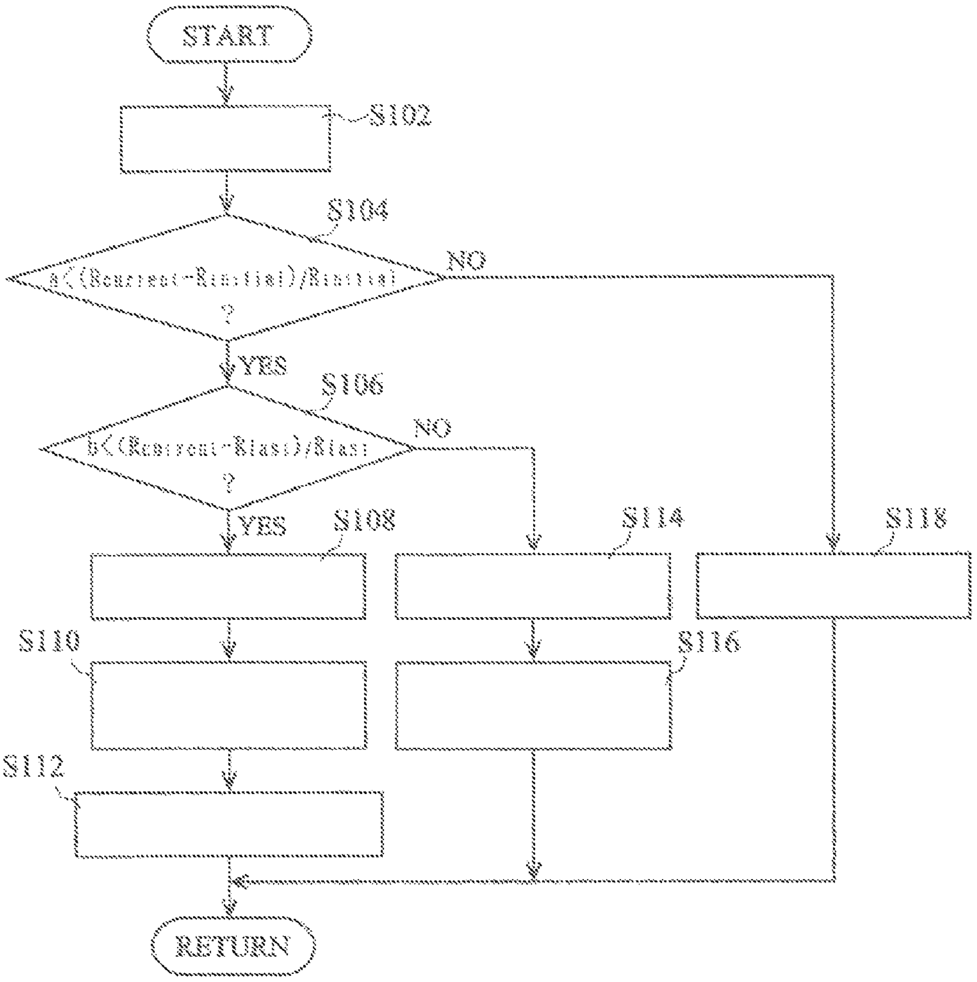

S102: MEASURE RESISTANCE OF GLP

S104: IS "a<(RCURRENT-RINITIAL)/RINITIAL" SATISFIED?

S106: IS "b<(RCURRENT-RLAST)/RLAST" SATISFIED?

S108: DETERMINE THAT GLP IS SUBJECTED TO ABNORMAL DEGRADATION

S110: RECORD INFORMATION ABOUT ABNORMAL DEGRADATION OF GLP

S112: CHANGE GLP CONTROL MAP

S114: DETERMINE THAT GLP IS SUBJECTED TO COMMON DEGRADATION

S116: RECORD INFORMATION ABOUT COMMON DEGRADATION OF GLP

S118: DETERMINE THAT GLP IS SUBJECTED TO NORMAL DEGRADATION

Fig. 4

(A)

| | | ENGINE SPEED (rpm) | | | | | | |
|---|---|---|---|---|---|---|---|---|
| | | 0 | 400 | 800 | 1000 | 1500 | 2000 | 3000 |
| FUEL INJECTION AMOUNT (mg) | 0 | 7 | 7 | 8 | 8.5 | 8.5 | 9 | 9 |
| | 10 | 7 | 7 | 8 | 8 | 8.5 | 8.5 | 9 |
| | 20 | 7 | 7 | 7.5 | 8 | 8 | 8.5 | 8.5 |
| | 30 | 7 | 7 | 7.5 | 7.5 | 8 | 8 | 8.5 |
| | 40 | 7 | 7 | 7 | 7.5 | 7.5 | 8 | 8 |
| | 60 | 7 | 7 | 7 | 7 | 7.5 | 7.5 | 8 |

(B)

| | | ENGINE SPEED (rpm) | | | | | | |
|---|---|---|---|---|---|---|---|---|
| | | 0 | 400 | 800 | 1000 | 1500 | 2000 | 3000 |
| FUEL INJECTION AMOUNT (mg) | 0 | 7 | 7 | 7 | 7 | 7 | 7 | 7 |
| | 10 | 7 | 7 | 7 | 7 | 7 | 7 | 7 |
| | 20 | 7 | 7 | 7 | 7 | 7 | 7 | 7 |
| | 30 | 7 | 7 | 7 | 7 | 7 | 7 | 7 |
| | 40 | 7 | 7 | 7 | 7 | 7 | 7 | 7 |
| | 60 | 7 | 7 | 7 | 7 | 7 | 7 | 7 |

METHOD OF DIAGNOSING GLOW PLUG AND GLOW PLUG DRIVE CONTROL DEVICE

BACKGROUND OF THE INVENTION

The present invention relates to a method of diagnosing the degradation of a glow plug and the presence or absence of the abnormality of the glow plug, and more particularly, to a method that improves reliability in diagnosis and the like.

Since the quality of a glow plug, which is used in an internal combustion engine such as a diesel engine, significantly affects the startability or the like of a diesel engine or the like, various methods, apparatuses, and the like for diagnosing the quality, the degree of degradation, and the like of the glow plug, have been proposed and been put to practical use in the past.

For example, a method and the like that measure a resistance value of a glow plug at the time of energization, compare the resistance value with a single threshold, and determine the quality of the glow plug on the basis of the result of the comparison are known well (for example, see JP-A-2010-127487 and the like).

However, a diagnosis result having sufficient reliability may not be obtained from the comparison with a single threshold due to product variation of each glow plug, difference in the degradation state caused from using each glow plug, or the like.

SUMMARY OF THE INVENTION

The invention has been made in consideration of the above-mentioned circumstances, and provides a method of diagnosing a glow plug and a glow plug drive control device that enables the determination of the presence or absence of the degradation and abnormality of a glow plug with high reliability using a relatively simple procedure.

According to a first aspect of the invention, there is provided a method of diagnosing a glow plug. The method includes: measuring a resistance value of the glow plug, which is in an operating state, as a latest resistance value; determining whether or not the rate of the change of the latest resistance value with respect to an initial resistance value of the glow plug exceeds a first predetermined value; determining whether or not the rate of the change of the latest resistance value with respect to a last resistance value that is a resistance value of the glow plug, which has been recently measured at the time of the acquisition of the latest resistance value, exceeds a second predetermined value when the rate of the change of the latest resistance value with respect to the initial resistance value of the glow plug exceeds the first predetermined value; and determining that the glow plug is in an abnormal degradation state when the rate of the change of the latest resistance value with respect to the last resistance value exceeds the second predetermined value.

According to a second aspect of the invention, there is provided a glow plug drive control device including: an operational control unit that performs the drive control of a glow plug; and an energization drive circuit that energizes the glow plug according to the drive control of the glow plug performed by the operational control unit. The operational control unit is adapted to calculate a resistance value of the glow plug, when energization current and an applied voltage of the glow plug are acquired, as a latest resistance value on the basis of the energization current and the applied voltage, is adapted to determine whether or not the rate of the change of the latest resistance value with respect to an initial resistance value of the glow plug exceeds a first predetermined value, is adapted to determine whether or not the rate of the change of the latest resistance value with respect to a last resistance value that is a resistance value of the glow plug, which has been recently measured at the time of the acquisition of the latest resistance value, exceeds a second predetermined value when determining that the rate of the change of the latest resistance value with respect to the initial resistance value of the glow plug exceeds the first predetermined value, and is adapted to determine that the glow plug is in an abnormal degradation state when determining that the rate of the change of the latest resistance value with respect to the last resistance value exceeds the second predetermined value.

According to the invention, it is possible to determine whether or not the glow plug is in an abnormal degradation state or in a common degradation state regardless of the variation of characteristics of every product by acquiring two types of changes, that is, the change of a resistance value of a glow plug with respect to an initial value and the change of a resistance value of a glow plug with respect to a recent resistance value and comparing each of the rates of the changes with a reference value. Accordingly, it is possible to obtain an effect of diagnosing the presence or absence of the degradation and abnormality of a glow plug with high diagnosis accuracy and high reliability as compared to the related art.

BRIEF DESCRIPTION OF THE DRAWINGS

FIG. 2 is a subroutine flowchart illustrating the procedure of processing for diagnosing a glow plug that is performed in the glow plug drive control device shown in FIG. 1.

FIG. 4 is a schematic diagram schematically showing an example of a glow plug control map, FIG. 4(A) is a schematic diagram schematically showing an example of a control map when the glow plug is normal, and FIG. 4(B) is a schematic diagram schematically showing an example of a control map that is used when it is determined that the glow plug is abnormal.

DESCRIPTION OF REFERENCE NUMERALS AND SIGNS

Figure 1:
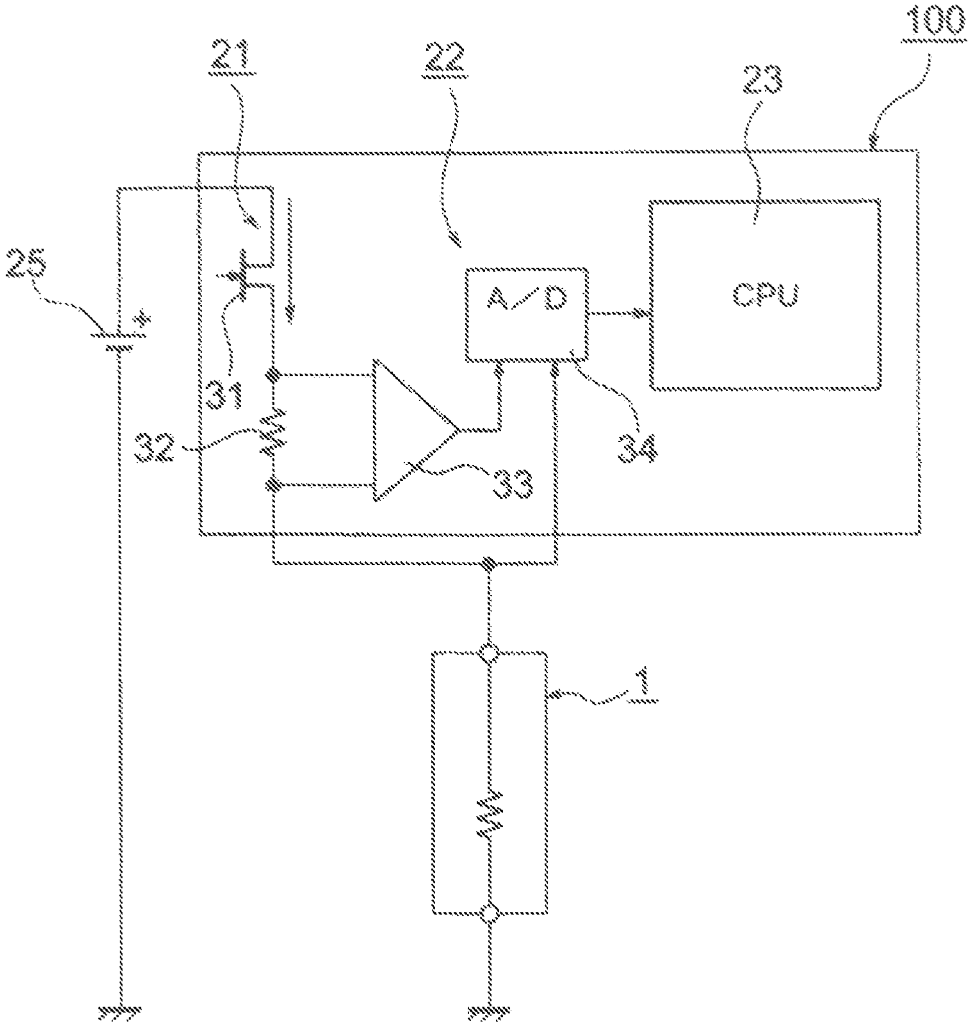
FIG. 1 is a structural view showing an example of the structure of a glow plug drive control device according to an embodiment of the invention.

1: glow plug
21: energization drive circuit
22: measuring circuit
23: operational control unit

DETAILED DESCRIPTION

An embodiment of the invention will be described below with reference to FIGS. 1 to 4.

Meanwhile, members, disposition, and the like to be described below do not limit the invention, and may be modified in various ways without departing from the scope of the invention.

First, a glow plug drive control device (hereinafter, referred to as a "GCU") according to an embodiment of the invention will be described with reference to FIG. 1.

A GCU 100 according to an embodiment of the invention roughly includes an energization drive circuit 21, a measuring circuit 22, and an operational control unit (written as "CPU" in FIG. 1) 23.

The energization drive circuit 21 includes an energization control semiconductor element 31 and a resistor 32 as main components, and is adapted to control the energization of a glow plug 1.

For example, a MOS FET or the like is used as the energization control semiconductor element 31. A drain of the energization control semiconductor element 31 is connected to a positive electrode of a vehicle battery 25, a source of the energization control semiconductor element 31 is connected to a positive electrode side of the glow plug 1 through a resistor 32, and a control signal sent from the operational control unit 23 is applied to a gate of the energization control semiconductor element 31, so that the conduction and non-conduction of the energization control semiconductor element 31 are controlled. The energization of the glow plug 1 is controlled by the conduction control of the energization control semiconductor element 31. Meanwhile, the energization control, which is performed by the energization drive circuit 21 and the operational control unit 23, is basically the same as that in the related art, and, for example, PWM (Pulse Width Modulation) control or the like is used. Further, a negative electrode side of the glow plug 1 is connected to the ground.

The measuring circuit 22 includes an operational amplifier 33 and an analog-to-digital converter (written as "A/D" in FIG. 1) 34 as main components, and is adapted to be capable of inputting a voltage drop, which is proportional to current flowing through the glow plug 1 and occurs at the resistor 32, to the operational control unit 23.

Voltages of both ends of the resistor 32 are input to the operational amplifier 33, and an output voltage of the operational amplifier 33 is input to the operational control unit 23 as a digital value by the analog-to-digital converter 34.

Further, a voltage, which is obtained on the positive electrode side of the glow plug 1, that is, a voltage applied to the glow plug 1 (glow plug voltage) is input to the operational control unit 23 through the analog-to-digital converter 34.

The value of the voltage, which is input to the operational control unit 23 through the analog-to-digital converter 34, is provided for processing for diagnosing the abnormality of the glow plug as described below.

The operational control unit 23 includes, for example, memory elements (not shown), such as a RAM and a ROM, that are provided in a micro-computer (not shown) having a commonly known or well-known structure, and an interface circuit (not shown) that outputs a control signal to the above-mentioned energization control semiconductor element 31, as main components.

Next, the procedure of processing for diagnosing the glow plug that is performed by the above-mentioned operational control unit 23 will be described with reference to a subroutine flowchart shown in FIG. 2.

First, the subroutine flowchart shown in FIG. 2 corresponds to the control and the like of the energization and drive of the glow plug 1 that are performed in the operational control unit 23 in the same manner as in the related art and one subroutine processing that is performed by the operational control unit 23.

And then, when processing is started by the operational control unit 23, a resistance value of the glow plug (GLP) 1 is measured first (see Step S102 of FIG. 2).

The resistance value of the glow plug 1 is calculated by dividing a glow plug voltage, which is obtained on the positive electrode side of the glow plug 1, that is, at an end of the glow plug 1 connected to the measuring circuit 22 in FIG. 1, by current that flows through the glow plug 1. Meanwhile, the resistance value is measured in a state in which the glow plug 1 is energized and driven according to the drive state of an engine (not shown) by the operational control unit 23.

Here, the glow plug voltage is input to the operational control unit 23 through the analog-to-digital converter 34 as described above.

Further, the current, which flows through the glow plug 1, is obtained by dividing the value of a voltage drop, which is input to the operational control unit 23 through the analog-to-digital converter 34 and occurs at the resistor 32, by a resistance value of the resistor 32 that is stored in advance.

The resistance value of the glow plug 1, which is calculated on the basis of data input to the operational control unit 23 through the analog-to-digital converter 34 as described above, is the latest resistance value (hereinafter, conveniently referred to as the latest resistance value") Rcurrent at this time, and is temporarily stored in an appropriate memory area of the operational control unit 23.

After that, it is determined whether or not the rate of the change of the latest resistance value Rcurrent with respect to an initial resistance value Rinitial of the glow plug 1 exceeds a first predetermined value a (see Step S104 of FIG. 2).

That is, it is determined whether or not "a<(Rcurrent−Rinitial)/Rinitial" is satisfied.

Here, "(Rcurrent−Rinitial)/Rinitial" is the rate of the change of the latest resistance value Rcurrent with respect to the initial resistance value Rinitial.

Further, the initial resistance value Rinitial of the glow plug 1 is a resistance value that is obtained when the glow plug 1 is mounted on a vehicle, and is a value that is measured in advance, and the measured value is stored in an appropriate memory area of the operational control unit 23.

Meanwhile, an appropriate value is set as the first predetermined value a on the basis of test or simulation results or the like according to the actual electrical characteristics, usage environment, or the like of the glow plug 1 to be used, and is not limited to a specific value.

If it is determined in Step S104 that "a<(Rcurrent−Rinitial)/Rinitial" is satisfied (YES), the procedure proceeds to processing of Step S106 to be described below. Meanwhile, if it is determined in Step S104 that "a<(Rcurrent−Rinitial)/Rinitial" is not satisfied (NO), the rate of the change is in a normal range that can be commonly obtained. Accordingly, it is determined that the degradation state of the glow plug 1 is normal, a series of processing is ended, and processing returns to a main routine (not shown) once (see Step S118 of FIG. 2).

Since the rate of the change of the latest resistance value Rcurrent with respect to the initial resistance value Rinitial is used for the determination of degradation as described above, it is possible to more accurately determine the presence or absence of degradation as compared to the related art according to the variation of temperature characteristics of each individual glow plug.

In Step S106, it is determined whether or not the rate of the change of the latest resistance value Rcurrent with respect to a resistance value Rlast of the glow plug 1, which has been recently measured at the time immediately before the latest resistance value Rcurrent is obtained, (hereinafter, conveniently referred to as the "last resistance value") exceeds a second predetermined value b.

That is, it is determined whether or not "b<(Rcurrent−Rlast)/Rlast" is satisfied.

Here, "(Rcurrent−Rlast)/Rlast" is the rate of the change of the latest resistance value Rcurrent with respect to the last resistance value Rlast.

Meanwhile, an appropriate value is set as the second predetermined value bon the basis of test or simulation results or the like according to the actual electrical characteristics, usage environment, or the like of the glow plug 1 to be used, and is not limited to a specific value.

If it is determined in Step S106 that "b<(Rcurrent−Rlast)/Rlast" is satisfied (YES), the procedure proceeds to processing of Step SlOB. Meanwhile, if it is determined in Step S106 that "b<(Rcurrent−Rlast)/Rlast" is not satisfied (NO), the procedure proceeds to processing of Step S114 to be described below.

First, in Step S108, determining that the rate of the change of the latest resistance value Rcurrent with respect to the last resistance value Rlast exceeds the second predetermined value b becomes the determination of abnormal degradation in consideration of the fact that the way of the change of a resistance value into the latest resistance value Rcurrent from the last resistance value Rlast exceeds the change of a resistance value commonly occurring.

Here, the determination of the presence or absence of abnormality, which is based on the change of the resistance value of the glow plug of the embodiment of the invention, will be described with reference to FIG. 3.

The resistance value of the glow plug 1 is generally increased with the degradation of the glow plug 1 as the glow plug is used. Further, if the degradation of the glow plug 1 corresponds to the degree of degradation that are common, it is thought that the change of the latest resistance value Rcurrent with respect to the initial resistance value Rinitial has a certain inclination, for example, as shown in FIG. 3 by a straight dotted line.

Figure 3:
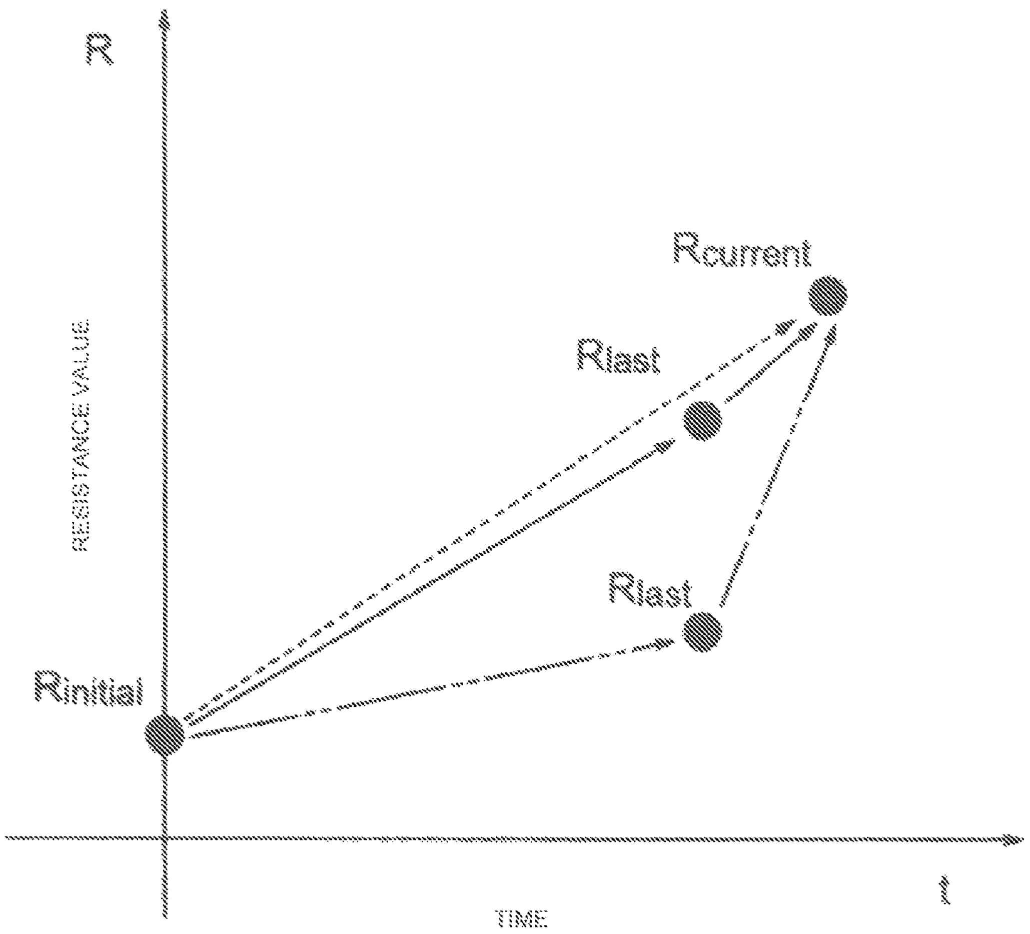
FIG. 3 is a characteristic diagram illustrating an example of the change of a resistance value of the glow plug.

Furthermore, if the degradation of the glow plug 1 corresponds to the degree of degradation that are common, it is thought that the change with respect to the last resistance value Rlast from the initial resistance value Rinitial and the change into the latest resistance value Rcurrent from the last resistance value Rlast also correspond to changes of, for example, characteristic lines shown in FIG. 3 by a solid line.

In contrast, when abnormality occurs on the degradation of the glow plug 1 due to some causes, that is, when a degradation state exceeding common degradation occurs, it is thought that the change into the latest resistance value Rcurrent from the last resistance value Rlast is obviously larger than the change at the time of common degradation (characteristic lines shown by a solid line of FIG. 3), for example, as shown in FIG. 3 by a two-dot chain line.

In the processing for diagnosing the glow plug of the embodiment of the invention, abnormal degradation and common degradation can be discriminated from each other on the basis of difference in way of the change of a resistance value caused from the degradation of the glow plug 1 as described above.

Returning to the description of FIG. 2 again, in response to the determination that the glow plug 1 is subjected to abnormal degradation in Step S108, an effect that the glow plug 1 reaches an abnormal degradation state is recorded in an appropriate memory area of the operational control unit 32 in Step S110.

After that, in Step S112, a glow plug control map is changed in response to the fact that the glow plug 1 is in an abnormal degradation state. Then, the processing returns to a main routine (not shown) once.

Here, a glow plug control map is a map in which a voltage applied to the glow plug 1 is determined according to the operating state of an engine (not shown).

A specific example of a glow plug control map is shown in FIG. 4, and the specific example will be described below with reference to FIG. 4.

First, FIG. 4 (A) shows an example of a glow plug control map when the glow plug 1 is in a normal state.

A voltage applied to the glow plug 1 is determined with regard to the combination of engine speed and fuel injection amount in the glow plug control map, and engine speed and fuel injection amount are input to the operational control unit 23 from an electronic control unit for the control of a vehicle (not shown).

Meanwhile, FIG. 4(B) shows an example of a glow plug control map that is used instead of the glow plug control map shown in FIG. 4 (A) by the processing for changing the glow plug control map in the above-mentioned Step S112 when it is determined that the glow plug 1 is subjected to abnormal degradation.

In the example shown in FIG. 4(B), the voltage applied to the glow plug 1 is uniformly set to 7 V regardless of the values of engine speed and fuel injection amount. This is to determine the control state of the glow plug 1 that sets the traveling state of a vehicle to a so-called limp home (degenerate operation) mode in consideration of a determination result that the glow plug 1 reaches an abnormal degradation state (see Steps S106 and S108 of FIG. 2).

Returning to the description of FIG. 2 again, if the procedure proceeds to Step S114 on the basis of the determination result of "NO" in the previous Step S106, it is determined that the glow plug 1 is in a common degradation state. After that, an effect that the glow plug 1 is in this common degradation state is recorded in an appropriate memory area of the operational control unit 32, a series of processing is ended, and processing returns to a main routine (not shown) once (see Step S116 of FIG. 2).

Meanwhile, it is preferable that the above-mentioned series of processing of FIG. 2 be repeatedly performed at a predetermined cycle. However, the predetermined cycle should be particularly arbitrarily set and is not limited to a specific value. Further, in this case, it is preferable that processing be performed when a voltage applied to the glow plug 1 is a predetermined effective voltage.

The invention is suitable to a vehicle or the like that requires more reliable diagnosis for a degradation state of a glow plug.

[FIG. 2]

S102: MEASURE RESISTANCE OF GLP

S104: IS "a<(RCURRENT−RINITIAL)/PINITIAL" SATISFIED?

S106: IS "b<(RCURRENT−RLAST)/RLAST" SATISFIED?

S108: DETERMINE THAT GLP IS SUBJECTED TO ABNORMAL DEGRADATION

S110: RECORD INFORMATION ABOUT ABNORMAL DEGRADATION OF GLP

S112: CHANGE GLP CONTROL MAP

S114: DETERMINE THAT GLP IS SUBJECTED TO COMMON DEGRADATION

S116: RECORD INFORMATION ABOUT COMMON DEGRADATION OF GLP

S118: DETERMINE THAT GLP IS SUBJECTED TO NORMAL DEGRADATION

[FIG. 3]

RESISTANCE VALUE

TIME

[FIG. 4A]
FUEL OIL CONSUMPTION
ENGINE SPEED
[FIG. 4B]
FUEL OIL CONSUMPTION
ENGINE SPEED

The invention claimed is:

1. A method of diagnosing a glow plug, the method comprising:
measuring a resistance value of the glow plug, which is in an operating state, as a latest resistance value;
determining whether or not a rate of the change of the latest resistance value with respect to an initial resistance value of the glow plug exceeds a first predetermined value;
determining whether or not the rate of the change of the latest resistance value with respect to a last resistance value that is a resistance value of the glow plug, which has been recently measured at a time of acquisition of the latest resistance value, exceeds a second predetermined value when the rate of the change of the latest resistance value with respect to the initial resistance value of the glow plug exceeds the first predetermined value;
determining that the glow plug is in an abnormal degradation state when the rate of the change of the latest resistance value with respect to the last resistance value exceeds the second predetermined value and the rate of the change of the latest resistance value with respect to the initial resistance value of the glow plug exceeds the first predetermined value; and
determining that the glow plug is in a common degradation state when the rate of the change of the latest resistance value with respect to the last resistance value is smaller than the second predetermined value.

2. The method of diagnosing a glow plug according to claim 1, further comprising:
determining that a degradation state of the glow plug is normal when the rate of the change of the latest resistance value with respect to the initial resistance value of the glow plug is smaller than the first predetermined value.

3. A glow plug drive control device comprising:
an operational control unit that performs drive control of a glow plug; and
an energization drive circuit that energizes the glow plug according to the drive control of the glow plug performed by the operational control unit,
wherein the operational control unit is configured to calculate a resistance value of the glow plug, when energization current and an applied voltage of the glow plug are acquired, as a latest resistance value on a basis of the energization current and the applied voltage, is configured to determine whether or not a rate of the change of the latest resistance value with respect to an initial resistance value of the glow plug exceeds a first predetermined value, is configured to determine whether or not the rate of the change of the latest resistance value with respect to a last resistance value that is a resistance value of the glow plug, which has been recently measured at a time of acquisition of the latest resistance value, exceeds a second predetermined value when determining that the rate of the change of the latest resistance value with respect to the initial resistance value of the glow plug exceeds the first predetermined value, and is configured to determine that the glow plug is in an abnormal degradation state when the rate of the change of the latest resistance value with respect to the last resistance value exceeds the second predetermined value and the rate of the change of the latest resistance value with respect to the initial resistance value of the glow plug exceeds the first predetermined value;
wherein the operational control unit is adapted to determine that the glow plug is in a common degradation state when determining that the rate of the change of the latest resistance value with respect to the last resistance value is smaller than the second predetermined value.

4. The glow plug drive control device according to claim 3,
wherein the operational control unit is adapted to determine that a degradation state of the glow plug is normal when determining that the rate of the change of the latest resistance value with respect to the initial resistance value of the glow plug is smaller than the first predetermined value.

5. The glow plug drive control device according to claim 3,
wherein the initial resistance value of the glow plug is obtained when the glow plug is mounted on a vehicle and stored in a memory element of the operational control unit.

6. The glow plug drive control device according to claim 5,
wherein the initial resistance value is measured in advance when the glow plug is mounted on a vehicle.

7. The method of diagnosing a glow plug according to claim 1, further comprising:
obtaining the initial resistance value for the glow plug when the glow plug is mounted on a vehicle, and
storing the initial resistance value of the glow plug in a memory element of the operational control unit.

8. The method of diagnosing a glow plug according to claim 2, further comprising:
recording the degradation state of the glow plug in a memory area of the operational control unit.

9. The method of diagnosing a glow plug according to claim 1, further comprising changing a glow plug control map when the glow plug is in the abnormal degradation state.

10. A glow plug drive control device comprising:
an operational control unit that performs drive control of a glow plug; and
an energization drive circuit that energizes the glow plug according to the drive control of the glow plug performed by the operational control unit,
wherein the operational control unit is configured to:
calculate a resistance value of the glow plug, when energization current and an applied voltage of the glow plug are acquired, as a latest resistance value on a basis of the energization current and the applied voltage,
determine that a degradation state of the glow plug is normal when the rate of the change of the latest resistance value with respect to an initial resistance value of the glow plug is smaller than a first predetermined value, and
when the rate of the change of the latest resistance value with respect to the initial resistance value of the glow plug exceeds the first predetermined value, determine whether or not the rate of the change of the latest resistance value with respect to a last resistance value that is a resistance value of the glow plug, which has been recently measured at a time of acquisition of the latest resistance value, exceeds a second predetermined value, wherein the glow plug is in an abnormal degradation state when the rate of the change of the latest resistance value with respect to the last resistance value exceeds the second predetermined value, and wherein the glow plug is in a common degradation state when the rate of the change of the latest resistance value with respect to the last resistance value is smaller than the second predetermined value.

11. The glow plug drive control device according to claim 10, wherein the operational control unit is configured to change a glow plug control map when the glow plug is in the abnormal degradation state.

* * * * *